United States Patent [19]

Deserno

[11] Patent Number: 4,753,521
[45] Date of Patent: Jun. 28, 1988

[54] LENS SYSTEM FOR FOCUSSING A DIVERGENT LASER BEAM

[75] Inventor: Ulrich Deserno, Munich, Fed. Rep. of Germany

[73] Assignee: Siemens Aktiengesellschaft, Berlin & Munich, Fed. Rep. of Germany

[21] Appl. No.: 754,261

[22] Filed: Jul. 12, 1985

[30] Foreign Application Priority Data

Sep. 19, 1984 [DE] Fed. Rep. of Germany ....... 3434440

[51] Int. Cl.⁴ .......................... G02B 9/60; G02B 6/32
[52] U.S. Cl. .................................. 350/465; 350/96.18
[58] Field of Search ............... 350/465, 482, 6.8, 96.18

[56] References Cited

U.S. PATENT DOCUMENTS

| 404,506 | 6/1889 | Schroder | 350/482 |
| 2,687,063 | 8/1954 | Coleman | 350/415 |
| 4,538,895 | 9/1985 | Higgins et al. | 350/6.8 |

FOREIGN PATENT DOCUMENTS 0166225  10/1983  Japan .................. 350/96.18

OTHER PUBLICATIONS

Optik, pp. 57-60 (1978).
"Light Coupling into Monomode Fibres", Oskar Krumpholz, Wiss. Ber., AEC-Telefunke, 48 (1975), pp. 90-94.
"An Effective Nonreciprocal Circuit for Semiconductor Laser-to-Optical-Fiber Coupling Using a YIC Sphere", Sugie et al., J. Lightwave Technology, 1 (1983).
"Efficient Laser Diode to Single-Mode Fiber Coupling Using a Combination", Saruwatari, IEEE J. Quantum Electronics, QE-17 (1981).
"Low-Loss Lens Connector for Single-Mode Fibers", S. Masuda, Appl. Optics, 21 (1982), pp. 3475-3483.

Primary Examiner—John K. Corbin
Assistant Examiner—Rebecca D. Gass
Attorney, Agent, or Firm—Hill, Van Santen, Steadman & Simpson

[57] ABSTRACT

A lens system for focussing a divergent laser beam, particularly for converting the three dimensional amplitude and phase distribution of the highly divergent laser beam of a semiconductor laser into the amplitude and phase distribution of the fundamental mode coupleable into a monomode fiber is disclosed. The lens system comprises a front element in the form of a collecting aplanatic meniscus and one or more following refractive lenses for focussing the laser beam emerging from the front element. The refractive front face of the meniscus facing the object side aberration free point is designed such that it at least approximately has the form of a phase surface of the divergent laser beam emanating from a location at least close to the object side aberation free point which impinges the meniscus. The front face thereby becomes largely aberration free. A minimal tilting of the meniscus relative to the laser radiation causes the part of the divergent laser radiation reflected by the front face to be refocussed next to the source, thus providing a highly reaction free coupling optics for coupling a semiconductor laser to a fiber. Alternatively, the lens system is superbly suited as an external resonator for a semi-conductor laser.

8 Claims, 3 Drawing Sheets

LENS SYSTEM FOR FOCUSSING A DIVERGENT LASER BEAM

BACKGROUND OF THE INVENTION

1. Field of the Invention

The present invention relates to a lens system for focussing a divergent laser beam and more particularly for converting the three dimensional amplitude and phase distribution of the highly divergent laser radiation of a semiconductor laser into the amplitude and phase distribution of the fundamental mode coupleable into and conducted in a mono mode fiber.

2. Description of the Prior Art

When constructing semiconductor laser modules, a key problem lies in the optical coupling between the laser diode and the monomode fiber to be coupled-on. The coupling should optimally transform the three-dimensional amplitude and phase distribution of the laser diode emission into the amplitude and phase distribution of the mode conducted in the fiber in order to obtain a good coupling efficiency.

Macro-optical and micro-optical arrangements have been disclosed as coupling arrangements. Micro-optical arrangements are, for example, the butt coupling between laser and end face of the fiber which, in the simplest case, is planar or arched in the form of a micro-lens, whereby the fiber end can additionally have a taper shape. Gradient lenses can also be employed instead of fused or fused-on micro-lenses.

In the known macro-optical coupling arrangements, single-lens or multi-lens systems, particularly lens systems of the type initially cited are used, their typical dimensions being large in comparison to the fiber or a corresponding waveguide (see O. Krumpholz, Wiss. Ber. AEG-Telefunken 48 (1975) pp. 90–94 and S. Masuda, T. Iwama, Appl. Opt. 21 (1982) pp. 3475–3483). The simplest case in this category is the coupling with a spherical lens (see Sugie et al., J. Lightwave Techn. 1 (1983) pp. 121–130). Condensor-like lens systems of the type initially cited are, however, often employed.

In such coupling arrangements or systems, the coupling efficiency of 50% could usually not be exceeded because none of those arrangements could handle the great divergency of the laser radiation emitted by standard semi-conductor lasers. (see Saruwatari, Sugi, Journ. of Quant. Electr. 17 (1981) pp. 1021–1027).

With the use of these known arrangements or systems, the reaction on the laser resonator typically lies in the per thousand range because of the slight distance of the first refractive surface from the laser mirror. Antireflection coating would in fact reduce the reaction but would further increase the losses at some other location due to the highly curved surfaces.

SUMMARY OF THE INVENTION

An object of the present invention is to provide a coupling optics for coupling a semi-conductor laser to a fiber, particularly to a monomode fiber, with a coupling efficiency of more than 50% and a great reduction of the reaction on the laser resonator.

This object is achieved with a lens system which is designed with a refractive front element positioned in the divergent laser beam and including one or more following refractive lenses for focussing the laser radiation emerging from an improved front element. The front element is formed of a collecting aplanatic meniscus for collimating the divergent laser beam emanating from the object side aberation free point or a location close to that point. Also, the front face of the meniscus facing the aberration free point is fashioned such that it at least approximately comprises the form of a phase surface of the divergent laser beam impinging on the meniscus. The collecting, aplanatic meniscus has a very highly aberration-free input aperture which enables a maximum coupling efficiency. At the same time, the reaction onto the laser resonator can be greatly reduced due to the special design of the refractive front face of the meniscus.

In the preceding as well as below, "close to" or "approximately" always mean "on the order of 10 w", whereby w denotes the diameter of the divergent laser radiation at the location from which it emanates. It can thereby be presumed that w is always smaller by orders of magnitude than the determining radius R of the refractive spherical face of the aplanatic meniscus facing away from the lens-side aberration-free point.

Under these conditions, it can also be assumed that the phase surfaces of the divergent laser radiation impinging the meniscus are spherical surfaces whose center lies at least close to the location from which the laser radiation emanates. This is true given the highly divergent laser radiation of a semiconductor laser. An embodiment of the invention which is particularly suited to this case is accordingly designed such that the front face of the meniscus is a spherical surface whose center coincides with the lens side aberration-free point or at least lies close to this point. This embodiment also has the advantage that it is technically relatively simple and can be fabricated by traditional means.

The special design of the front face of the aplanatic meniscus in the form of the phase surface of the divergent laser radiation impinging the meniscus has the effect that the rays of the divergent laser beam pass through this front face at least approximately unrefracted and that the part of the divergent laser beam reflected by this front face is refocussed to the location from which it emanates. It is precisely the energy concentration in the focus of the reflected part which is particularly helpful for preventing the reaction on the laser resonator. This purpose is accomplished when the front face of the meniscus is disposed such relative to the divergent laser beam that the part of the laser beam reflected by the front face is refocussed laterally next to the location from which the divergent laser beam emanates. To provide this purpose in practice requires one to minimally tilt the aplanatic meniscus so that its axis proceeds laterally past such location. In order to reduce the reaction to extremely low values, it suffices to select the tilt angles on the order of 10 w/R.

A lens system embodying the principles of the invention is therefore advantageously employed as a coupling optics for reaction free coupling of the laser radiation of a semi-conductor laser into a fiber.

The overall lens system can be minimally tilted together with the meniscus, so that the confocal reflection of not only the front face of the meniscus but also of further concave surfaces of the system that may be provided do not proceed into the location from which the divergent laser beam emanates, i.e. onto the laser mirror of the semi-conductor laser.

With such a lens system, the reaction of the system the laser resonator can be reduced to values below $-60$ dB, compared to $-30$ through $-40$ dB experienced by standard arrangements with positively curved surfaces. Due to the high aberration free input apertures of, for example, 0.6 through 0.8, coupling efficiencies of about 80% can be realized, compared to 50% experienced by individual micro-lenses or traditional macro-optical lens systems.

It is also advantageous to use the part of the divergent laser beam reflected by the front face of the meniscus, which is laterally refoccused next to the location from which the laser radiation emerges from the semi-conductor laser, for control or regulation of the laser. The focus of the part of the laser radiation reflected by the front face can be employed for the feed of a low-cost, small-surface monitor photodiode which may be attached to the carrier of the semi-conductor laser.

As known, the aplanatic meniscus converts the radiation of the highly divergent laser beam emanating from the object-side aberration-free point into a weakly divergent beam free of spherical aberration and coma whose rays consequently seem to emanate precisely from an image-side aberration-free point. This weakly divergent beam can be more easily processed imaging-free than a highly divergent beam. The refractive lenses following the meniscus can be fabricated with spherical and/or aspherical refractive faces. Given the use of aspherical refractive faces, the number of these faces and, thus, the loss of the overall lens system can be reduced. An advantageous embodiment of the lens system of the invention is designed such that a telecentric beam path is realized in the lens system. This embodiment is particularly well-suited for the incorporation of auxiliary elements, for example polarizers and Faraday rotators for optical isolation, or of aspherical, for example cylindrical, lenses for correcting astigmatism.

In addition to the good coupling efficiency and the low reaction that are obtainable with it, the lens system of the invention has the advantages of a large working distance and of modular adaptability to different tasks. Moreover, such a lens system can be considered not only for laser modules but also for other applications that shall be discussed below.

One embodiment of the lens system of the invention is designed such that the front face of the meniscus is disposed in a manner relative to the divergent laser radiation that the part of this laser radiation reflected by the front face is refocussed at that location from which the divergent laser beam emanates. In this embodiment, thus, the reflected part is refocussed into the source of the divergent laser beam, whereby an extremely high reaction on the source, for example a semi-conductor laser, is established. This embodiment is thus superbly suited as an external resonator for the semi-conductor laser and, accordingly, this embodiment is applied as an external optical resonator for a semi-conductor laser. In this case, the front face of the meniscus serves as a resonator mirror and the advantage is that a part of the laser radiation is coupled out by or through the lens system and the out-coupled radiation can be coupled into a preferably single-mode transmission fiber with high efficiency. The reflection at the front face of the meniscus can be influenced as desired by means of a suitable optical coating. A dynamic single-mode laser can be thus constructed.

Further advantageous applications of the lens system of the invention include precision coupling into optical fibers for measuring and for reading and writing information out of and into an optical storage. If the lens system is used for profile measurement at fibers having extreme topical resolution, the measurement of the refracted near field comes into consideration above all else. If the lens system is used for reading and writing information out of and into an optical storage, the lens system can be advantageously utilized because its high input aperture and its extremely low spherical aberration enable a high energy concentration when focussing the laser beam used for writing or reading and thereby enable a high information density of about 1 bit/$\mu m^2$ on the optical storage medium.

The lens system of the invention composed of single lenses is preferably manufactured as a compact structural unit wherein the single lenses are durably combined dimensionally stable in a mechanical mount in the manner of an objective or condenser. This compact structural unit can be mass produced in series with classical manufacturing methods in the factory with corresponding production and test means.

When the lens system of the invention is used for coupling a semi-conductor laser to a fiber, it is particulary the adjustment of the lens system to the semi-conductor laser that is critical. This must be done with high precision and must be better than 0.5 m in radial direction and better than 1 m in axial direction. Further, the inventive tilt of the meniscus or lens system must be capable of being realized for avoiding reaction onto the semi-conductor laser. Over and above this, costs, space requirements, long-term stability and temperature sensitivity of the mechanical elements of such an apparatus must be brought to an acceptable level.

An apparatus for coupling the semi-conductor laser to a fiber, particularly to a monomode fiber, by means of a lens system of the invention which largely meets the said demands is disclosed as well as an advantageous embodiment of this apparatus.

BRIEF DESCRIPTION OF THE DRAWINGS

The invention shall be explained by way of example in the following description with reference to the Figures.

DESCRIPTION OF THE PREFERRED EMBODIMENTS

Figure 1:
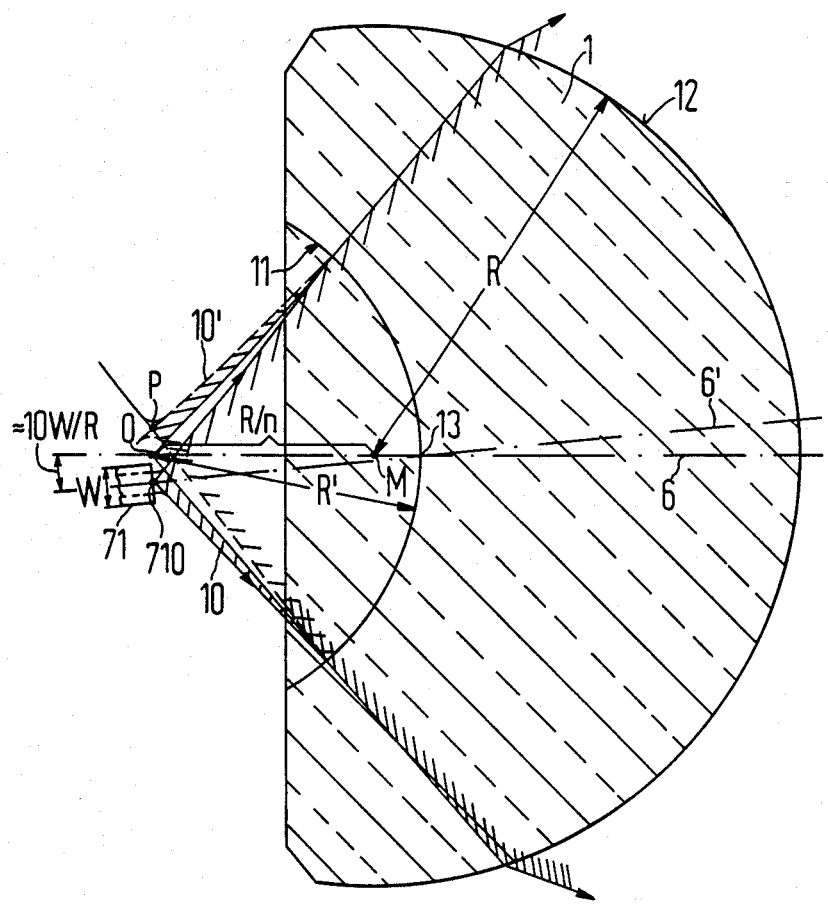
FIG. 1 is a side sectional view of an aplanatic meniscus which can form the front element of a lens system embodying the principles of the invention.

The basis of an aplanatic meniscus is the Weierstrass construction (see Matossi, Optik (De Gruyter 1978) p. 58).

For a sphere having the radius R made of a material having the refractive index n, this states that all rays emanating from an object side point having the distance R/n from the sphere center proceed such after refraction at the sphere surface as though they were emanating from a point on the straight line through the object side point and the center of the sphere at a distance R·n from the sphere center. This point is thus a virtual image of the object side point and both points thus form aberration-free points. What is essential is that, given this specific geometry, the refraction of the sphere surface is also "aplanatic", i.e. free of aberration and coma, for large aperture angles. The divergency of the primary light cone can thus be reduced without cancelling the diffraction limitation. The sphere according to Weierstrass is thus an advantageous component for pre-processing the high numerical aperture of semi-conductor lasers. The weakly divergent bundle generated by this sphere can be further collimated with flat lenses and, finally, focussed onto the end face of a fiber. The numerical aperture of monomode fibers lies at 0.11. In order to illuminate the fiber faultlessly, the optics must have at least twice the angular opening, i.e. 0.22. At the fiber side, however, no extreme divergency need be processed. A corresponding lens system can, for example, be formed of a sphere according to Weierstrass as front element and a sphere for refocussing.

Better aberration values can be achieved upon the use of a plurality of lenses. The single lenses are then weakly curved so that high-grade antireflection coatings can be applied without any signficant negative effect. Spheres according to Weierstrass, however, are not formed as complete spheres in practice because the object side aberration free point would lie in the sphere, rather, as known, they are formed as an aplanatic meniscus in the form of a section of such a sphere with a usually planar, refractive cut face wherein the object-side aberration-free point lies outside, whereby the refractive cut face forms the refractive front face of the meniscus facing the object side aberration free point.

In contrast to the spherical surface of the meniscus facing away from the object side aberration free point, however, the refractive front face is usually not aberration free, particularly when it is a planar face. Its influence, for example in microscopy, is simply suppressed by means of immersion. In the case of a lens system of the type initially cited, however, this is not possible and it must be seen to that the front face has no optical effect or only a negligible optical effect. This is achieved in accord with the proposal in that this refractive front face is given the form of a phase surface of the divergent radiation emanating from the object side aberration free point which impinges the meniscus. In this case, the phase surfaces of the divergent lightwave are not deformed or are not significantly deformed when passing through the front face of the meniscus. In the geometrical optical image, this means that light rays of the divergent laser beam are not or not significantly refracted when passing through the front face.

The phase fronts of the divergent laser beam of a semiconductor laser are spherical surfaces in the case of a Gaussian beam. Given a non-Gaussian shaped emission characteristic, the spherical form is a good approximation, at least in the far field. It is therefore desirable to design the refractive front face of the aplanatic meniscus in the form of a spherical surface whose center lies in the object side aberration free point of the meniscus.

FIG. 1 shows an example of such an aplanatic meniscus in an axial meridian section, this meniscus being referenced 1 here and in the following. In this exemplary embodiment, the refractive index n of the glass of this meniscus is about 2.0 and a radius R of a refractive spherical surface 12 of the meniscus 1 facing away from an object side aberration free point 0 is 1.750 mm. With these values, the object side aberration free point 0 disposed on a longitudinal axis 6 lies at a distance of $R/n = 0.875$ mm from a center M of the spherical surface 12.

A refractive front face 11 of the meniscus 1 facing the object side aberration free point 0 is designed as a spherical surface around the point 0 which, for example, comprises a radius $R' = 1.067$ mm.

Divergent radiation which emanates from the point 0 passes through the front face 11 essentially unrefracted and proceeds to the spherical surface 12 where it is refracted abberration free. The part of the divergent beam reflected back from the front face 11 is refocussed in the point 0. When a mirror of the semi-conductor laser is thus arranged at the point 0, then the part of the divergent laser beam emerging from the laser which is reflected back by the surface 11 is refocussed in the mirror.

On the other hand, a minimal tilt of the meniscus 1 around, for example, a vertex 13 of the front face 11 suffices in order to dispose the focus of the back-reflected part of the divergent beam outside of the source, whereby an extremely high freedom from reaction results.

The latter case is schematically illustrated in FIG. 1. A semi-conductor laser 71 emits its highly divergent laser illumination 10 in the direction of an axis 6' on which the meniscus is disposed such that the axis 6' intersects the vertex 13. The meniscus 1 is tilted slightly around the vertex 13 relative to the axis 6', so that the axis 6 of the meniscus 1 itself describes an angle of about 10 w/R with the axis 6' measured in radian measure, wherein, w represents to the diameter of the highly divergent laser illumination 10 at the location of the source, i.e. at a mirror 710 of the semi-conductor laser 71. In FIG. 1, this diameter is shown greatly exaggerated. In practice, it is several orders of magnitude smaller than the radius R' of the spherical front face 11. The minimal tilt effects that a part 10' of the divergent laser beam 10 reflected by the front face 11 is refocussed at a point P laterally next to the source (710) of the divergent laser beam 10. As already indicated, the relationships are shown with great exaggeration in FIG. 1. In practice, the tilt angle is hardly visible to the naked eye. Both the source of the divergent radiation 10 as well as the point P will be disposed close to the object side aberration free point 0 of the meniscus 1.

Figure 2:
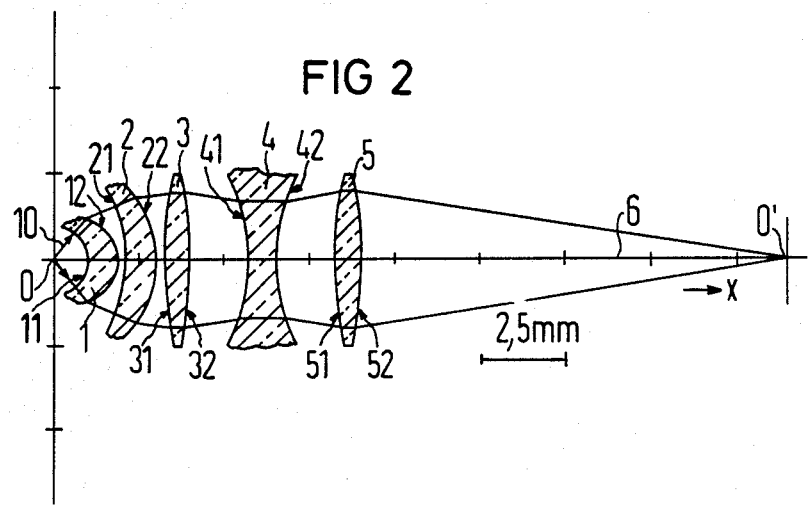
FIG. 2 is a schematic side view of complete lens system with an aplanatic meniscus as front element.

FIG. 2 shows a calculated exemplary embodiment of a complete lens system comprising the aplanatic meniscus 1 as a front element whose dimensions, however, do not coincide with the specific dimensions of the meniscus 1 according to FIG. 1. A plurality of refractive lenses 2 through 5 of this system following the meniscus 1 are composed, in sequence, of a second, collecting aplanatic meniscus 2 disposed immediately following the meniscus 1, of a biconvex lens 3 of a biconcave diverging lens 4 and, finally, of a biconvex lens 5. The following table indicates the exact dimensions of this system in an exemplary embodiment, whereby the x-position indicates the distance of a vertex of the particular refractive lens face from the object side aberration free point 0 of the meniscus in the direction of the axis 6 of the system. The centers of curvature of all refractive surfaces lie on the axis 6. A negative radius denotes that the center of curvature of the particular refractive face 12 lies to the left of the face in FIG. 2. A positive radius specification denotes that the center of curvature of the particular refractive face lies to the right of the face.

| Lens in FIG. 2 | Refractive surface in FIG. 2 | x-position (mm) | Radius of the refractive surfaces (mm) | Refractive index of the lens |
| --- | --- | --- | --- | --- |
| 1 | 11 | 1 | −1 | 2 |
|   | 12 | 1.875 | −1.25 |   |
| 2 | 21 | 2.125 | −4 | 2 |
|   | 22 | 3 | −3.00825 |   |
| 3 | 31 | 3.25 | 11.9105 | 2 |
|   | 32 | 4 | −11.9105 |   |
| 4 | 41 | 5.75 | −4.95 | 1.5 |
|   | 42 | 6.5 | 4.95 |   |
| 5 | 51 | 8.25 | 11.9105 | 2 |
|   | 52 | 9 | −11.9105 |   |

The medium between the lenses 1 through 5 is air with the refractive index 1.

Also shown in FIG. 2 is the beam path of the highly divergent laser beam 10 emanating from the object side aberration free point 0 of the meniscus 1 or from close to this point which is focussed largely free of spherical aberration and coma at a point 0' on or very close to the axis 6. The overall lens system of FIG. 2 has a focal length of 3.004327 mm, a magnification of −4.957206 and the parazial image point 0' lies at the x-position 21.47706 mm. The center of the curvature of the front face 11 of the meniscus 1 again coincides with its object side aberration free point 0.

A minimal tilt of the meniscus 1 relative to the axis 6' of the highly divergent laser beam 10 can be undertaken such that the overall system or only the meniscus 1 alone is minimally tilted.

There is great freedom with respect to the design of the refractive lenses following the meniscus. They can be designed in accord with the individual applied case. In the simplest case, an aplanatic meniscus and a following spherical single lens suffice. This lens is then preferably formed such that the rays proceed parallel in the inside of the lens.

The following single lens can also be replaced by two lenses which are fashioned such that the parallel beam path exists but lies outside of the lenses. Further elements can then be inserted into the parallel beam path, for instance an element of an optical isolator.

The overall system can also comprise a further aplanatic meniscus at the output side.

The angular divergency which those lenses following the front element must process can be further reduced when an additional aplanatic meniscus is inserted between these following lenses and the front element, as is the case in the lens system of FIG. 2.

It is beneficial in any case to fashion the following lenses such that the beam path between the single lenses proceeds telecentrically, i.e. that there are planar wave fronts, whereby the spacing between such lenses can be changed without a significant disturbance of the beam path. This type of beam guidance is beneficial because additional components such as, for example, cylinder lenses for correcting astigmatism or, as already mentioned, an optical isolator can be inserted.

In this case, the optical isolator can have the form of a plate or of a short cylinder with planar end faces. When, on the other hand, it is desired to have the smallest possible number of individual elements, a structure having a single, symmetrically irradiated intermediate lens of magneto-optical material can be employed and/or a number of spherical elements can be replaced with aspherical elements.

The spherical aberration can be corrected to a greater degree the more lenses the lens system contains. The system can be further optimized with respect to the form, position and refractive power of the individual lenses when its lenses, particularly its intermediate lenses as well, are fabricated of more highly refractive material. For operating wavelengths in the 1.3 through 1.6 μm range, materials such as Si, rutile and chalcogenide glasses which have a refractive index between 2 and 3.5 come into consideration. A further advantage of these materials is that they can be provided with extremely high-quality antireflection coatings.

If there is careful manufacture and proper antireflection coating, insertion losses of 1 dB and less can be obtained if there is also adequately corrected spherical aberration.

Figure 3:
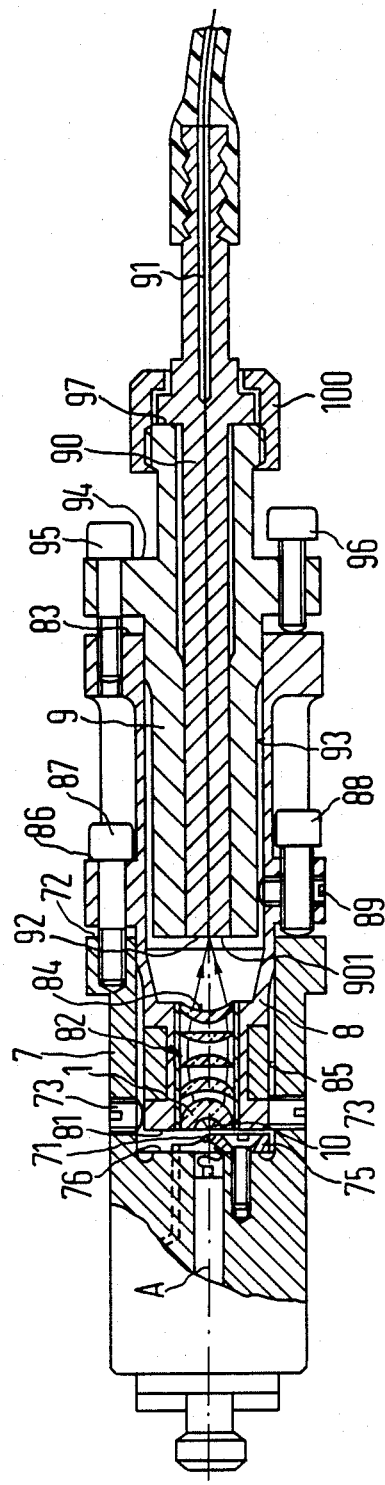
FIG. 3 is a longitudinal sectional view through an exemplary embodiment of an apparatus for coupling a seminconductor laser to a monomode fiber by means of a lens system.

FIG. 3 shows an exemplary embodiment of an apparatus for coupling the semi-conductor laser 71 to a monomode fiber 91 through or by means of a lens system 82 shown here in an axial longitudinal section. The apparatus comprises a jack 7 in the interior whereof the semi-conductor laser 71 is disposed and mounted approximately on an axis A of the jack 7. The mounting arrangement is such that the semi-conductor laser 71 and a regulating or monitor diode (not shown) that may be provided are secured to a carrier 75 which is screwed to a radially inwardly protecting shoulder 76 or to a floor of the jack 7. The semi-conductor laser 71 is disposed approximately on the axis A such that it emits in the direction of the axis A toward an open end 72 of the jack 7. A jack 8 functioning both as plug as well as a socket is axially plugged through the open end 72 into the jack 7 with an end 81 leading. The lens system 82 is mounted inside the jack 8 such at the end 81 that the front element thereof in the form of the aplanatic meniscus 1 lies opposite the semi-conductor laser 71.

The lens system 82, for example, is a five-lens system fashioned as a compact structural unit in the form of a minicondenser which is fixed as such in the jack 8.

A precision jack 9 open at both sides is axially plugged into the receptacle 8 at its other, open end 83. A precision plug 90 containing the fiber 91 is in turn axially plugged into the jack 9 with a leading end 901 which lies opposite the output side 84 of the lens system 82 and in which an end face 92 of the fiber 91 lies exposed.

Adjustment screws are provided for the exact adjustment of the mirror of the semi-conductor laser 71 in the object side, aplanatic point of the meniscus 1 of the lens system 82, these adjustment screws enabling an adjustment of the lens system 82 both in radial as well as in axial direction of the jack 7.

The adjustment of the lens system 82 in radial direction relative to the jack 7 is accomplished by means of a plurality of radial set screws 73 uniformly distributed over the circumference of the jack 7 and screwed through the wall of the jack 7, these set screws engaging an outside circumference 85 of the jack 8 and the one end 81 of the jack 8 being radially adjustable with them.

The adjustment of the lens system 82 in axial direction relative to the jack 7 is accomplished by means of a plurality of axial screws 87, 88 which penetrate a radially outwardly projecting flange defining the shoulder 86 formed at the jack 8 and which engages at the open end 72 of the plug 7. One half of the plurality of axial screws 87, 88, the screws 87, are designed as straining screws uniformly distributed over the circumference of the jack 8 which not only enable the relative axial adjustment between the jack 7 and the socket 8 but also axially tenter these two parts. The other axial screws 88 likewise uniformly distributed over the circumference of the socket 8 are designed as counter-screws to the straining screws 87 to hold the axial adjustment of the socket 8 relative to the jack 7.

The exposed end face 92 of the fiber 91 can be adjusted in radial and axial direction to the focus of the lens system 82 in a similar fashion. A plurality of radial set screws 89 uniformly distributed over the circumference of the socket 8 and screwed into the wall thereof are provided for radial adjustment, these engaging the outside circumference 93 of the precision jack 9. A plurality of axial screws 95, 96 are provided for axial adjustment, these penetrating a radially outwardly projecting flange defining the shoulder 94 formed at the precision jack 9 and these axial screws engaging at the open, other end 83 of the socket 8. One half of the plurality of axial screws 95, 96, the screws 95, are, similar to screws 87, designed as straining screws uniformly distributed over the circumference of the precision jack 9 and the remaining axial screws 96 are designed as counter-screws to the straining screws 95 which are uniformly distributed over the circumference.

Three radial adjustment screws, for example, suffice for every radial adjustment and, for each axial adjustment, six axial screws, three axial straining screws and three axial counterscrews suffice.

The precision plug 90 is expediently fixed to the outer end 97 of the precision jack 9 by means of a spigot nut 100, so that a compact and solid apparatus is established overall which, for example, can also be surrounded by a thermal protection sleeve. It can also be augmented with elements for temperature regulation, for example with Peltier crystal cooling elements and a thermal protection sleeve.

The jack 7 and the precision plug fixture with the precision jack 9 and the precision plug 90 can be constructed with commercially available components after slight modifications. The only additional elements are the socket 8 and the radial screws 73, 89, 87, 88, 95 and 96.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. A lens system couplable to a divergent laser beam for converting the three dimensional amplitude and phase distribution of the highly divergent laser radiation of a semi-conductor laser into the amplitude and phase distribution of the fundamental mode which is couplable into and conducted in a monomode fiber, including a refractive front element disposed in the divergent laser beam and including at least one following refractive lens for focussing the laser radiation emerging from the front element, comprising the front element being formed as a collecting aplanatic meniscus for collimating the divergent laser beam emanating from a location lying at least close to an object side aberration free point; a front face of the meniscus facing the object side aberration free point having a contour such that it at least approximately comprises the form of a phase surface of the divergent laser beam impinging on the meniscus, said front face of the meniscus being disposed such relative to the divergent laser beam that the part of the laser radiation reflected by the front face is refocussed laterally next to the location from which the divergent laser beam emanates, said coupling being provided by means of an apparatus comprising:
   a first jack with a hollow interior and an open end;
   a semi-conductor laser mounted in said interior which emits in the direction of said open end of said first jack;
   a second jack pluggable through said open end with one end at which said lens system is disposed such that said aplanatic meniscus of said lens system lies opposite the semi-conductor laser;
   a precision plug jack open at both sides being pluggable into a second end of said second jack;
   a precision plug containing an optical fiber pluggable into said precision plug jack such that an exposed leading end of the fiber lies opposite an output side of the lens system;
   a plurality of radial setscrews screwed into a wall of the first jack and engagable with the outside circumference of the second jack for radial adjustment of one end of the second jack relative to the semi-conductor laser;
   a plurality of axial screws penetrating through a shoulder of the second jack and engagable with the open end of the first jack for axial adjustment of the second jack relative to the second jack;
   a plurality of radial set screws screwed into a wall of the second jack and engagable with the outside circumference of the precision plug jack for radial adjustment of the exposed fiber and face relative to said lens system; and
   a plurality of axial screws penetrating a shoulder of the precision plug jack and engagable at the other end of the second jack for axial adjustment of said exposed fiber end face relative to said lens system.

2. A system according to claim 1, wherein said front face of the meniscus is a spherical surface whose center at least lies close to the object side aberration free point.

3. A lens system according to claim 1, wherein a telecentric beam path is formed by the lenses in the system.

4. An apparatus according to claim 1, wherein some of the axial screws form straining screws for the axial tentering of the first jack to the second jack and of the second jack to the precision plug jack, and the remaining axial screws form counterscrews to the straining screws.

5. A lens system couplable to a divergent laser beam for converting the three dimensional amplitude and phase distribution of the highly divergent laser radiation of a semi-conductor laser into the amplitude and phase distribution of the fundamental mode which is couplable into and conducted in a fiber, particularly a monomode fiber, including a refractive front element disposed in the divergent laser beam and including at least one following refractive lens for focussing the laser radiation emerging from the front element, comprising the front element being formed as a collecting aplanatic meniscus for collimating the divergent laser beam emanating from a location lying at least close to an object side aberration free point; a front face of the meniscus facing the object side aberration free point having a contour such that it at least approximately comprises the form of a phase surface of the divergent laser beam impinging on the meniscus, said front face of the meniscus being disposed such relative to the divergent laser beam that the part of the laser radiation reflected by the front face is refocussed at that location from which the divergent laser beam emanates, said coupling being provided by means of an apparatus comprising:

a first jack with a hollow interior and an open end;

a semi-conductor laser mounted in said interior which emits in the direction of said open end of said first jack;

a second jack pluggable through said open end with one end at which said lens system is disposed such that said aplanatic meniscus of said lens system lies opposite the semi-conductor laser;

a precision plug jack open at both sides being pluggable into a second end of said second jack;

a precision plug containing an optical fiber pluggable into said precision plug jack such that an exposed leading end of the fiber lies opposite an output side of the lens system;

a plurality of radial setscrews screwed into a wall of the first jack and engagable with the outside circumference of the second jack for radial adjustment of one end of the second jack relative to the semi-conductor laser;

a plurality of axial screws penetrating through a shoulder of the second jack and engagable with the open end of the first jack for axial adjustment of the second jack relative to the second jack;

a plurality of radial set screws screwed into a wall of the second jack and engagable with the outside circumference of the precision plug jack for radial adjustment of the exposed fiber and face relative to said lens system; and a plurality of axial screws penetrating a shoulder of the precision plug jack and engagable at the other end of the second jack for axial adjustment of said exposed fiber end face relative to said lens system.

6. A lens system according to claim 5, wherein said front face of the meniscus is a spherical surface whose center at least lies close to the object side aberration free point.

7. A lens system according to claim 5, wherein a telecentric beam path is formed by the lenses in the system.

8. An apparatus according to claim 5, wherein some of the axial screws form straining screws for the axial tentering of the first jack to the second jack and of the second jack to the precision plug jack, and the remaining axial screws form counterscrews to the straining screws.

* * * * *